US009350733B2

(12) United States Patent
O'Sullivan et al.

(10) Patent No.: US 9,350,733 B2
(45) Date of Patent: May 24, 2016

(54) EMERGENCY SERVER ACCESS FOR OFFLINE USERS

(75) Inventors: Patrick Joseph O'Sullivan, Ballsbridge (IE); Fred Raguillat, Dunboyne (IE); Edith Helen Stern, Yorktown Heights, NY (US); Barry E. Willner, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 109 days.

(21) Appl. No.: 13/290,551

(22) Filed: Nov. 7, 2011

(65) Prior Publication Data
US 2013/0117407 A1 May 9, 2013

(51) Int. Cl.
| | |
|---|---|
| G06F 15/16 | (2006.01) |
| H04L 29/06 | (2006.01) |
| H04W 4/22 | (2009.01) |
| H04L 12/58 | (2006.01) |

(52) U.S. Cl.
CPC ............... *H04L 63/10* (2013.01); *H04L 51/22* (2013.01); *H04W 4/22* (2013.01); *H04L 63/08* (2013.01)

(58) Field of Classification Search
CPC ....... H04L 67/02; H04L 69/329; H04L 29/06; H04L 67/04; H04L 51/04; H04L 12/581; H04L 67/2833; H04L 67/306; H04L 67/1021; H04L 67/2823; H04L 67/22; H04L 41/12; H04L 43/0835; H04L 43/0847; H04L 12/585; H04L 51/12; H04L 63/08; H04L 63/10; H04L 51/28; H04L 63/20; H04L 2209/60; H04L 2463/082

USPC ................. 709/217, 203, 219, 227, 230, 238
See application file for complete search history.

(56) References Cited

U.S. PATENT DOCUMENTS

| | | | |
|---|---|---|---|
| 6,073,106 A | 6/2000 | Rozen et al. | |
| 6,119,163 A * | 9/2000 | Monteiro et al. | ............. 709/227 |
| 6,917,670 B2 | 7/2005 | Isomura | |
| 7,188,358 B1 * | 3/2007 | Hisada et al. | ..................... 726/2 |
| 7,882,235 B2 * | 2/2011 | Yumoto et al. | ................ 709/227 |
| 7,991,873 B2 * | 8/2011 | Kato et al. | .................... 709/224 |
| 8,356,097 B2 * | 1/2013 | Cancel et al. | .................. 709/224 |
| 2002/0103851 A1 | 8/2002 | Kikinis | |
| 2003/0046586 A1 | 3/2003 | Bheemarasetti et al. | |
| 2003/0187955 A1 * | 10/2003 | Koch | ............................ 709/219 |
| 2003/0191799 A1 * | 10/2003 | Araujo et al. | ................. 709/203 |
| 2006/0206570 A1 * | 9/2006 | Heidloff et al. | ............... 709/206 |
| 2007/0279247 A1 * | 12/2007 | Rye et al. | ................ 340/825.72 |

(Continued)

OTHER PUBLICATIONS http://www.theemaillaundry.com/continuity, "Email Continuity: Emergency Email Access from The Email Laundry", p. 1 of 1, Date:2007-2010.

(Continued)

*Primary Examiner* — Brian J Gillis
*Assistant Examiner* — Thao Duong
(74) *Attorney, Agent, or Firm* — Brian J. Colandreo, Esq.; Jeffrey T. Placker, Esq.; Holland & Knight LLP (57) ABSTRACT

A method and system for emergency server access to offline users may include one or more computing devices receiving a request for offline access of data. The request for offline access of data may contain information to identify the offline user and specific data. An action to provide the specific data may be determined responsive to the identification of the offline user. The action may be executed responsive to the determination. The specific data may be transmitted.

23 Claims, 4 Drawing Sheets

(56) References Cited

U.S. PATENT DOCUMENTS

| | | | |
|---|---|---|---|
| 2008/0086540 A1* | 4/2008 | Scott et al. | 709/217 |
| 2008/0209012 A1* | 8/2008 | Abujbara | G06F 9/468 |
| | | | 709/219 |
| 2008/0256643 A1* | 10/2008 | Jones et al. | 726/27 |
| 2009/0094337 A1* | 4/2009 | Dias | 709/206 |
| 2009/0300127 A1* | 12/2009 | Du | 709/206 |
| 2010/0111276 A1 | 5/2010 | Hartley et al. | |
| 2010/0162383 A1* | 6/2010 | Linden et al. | 726/13 |
| 2011/0153594 A1* | 6/2011 | Hagenbuch et al. | 707/718 |

OTHER PUBLICATIONS http://www.email2phone.net, p. 1 of 1, Date:2002-2008.

* cited by examiner

EMERGENCY SERVER ACCESS FOR OFFLINE USERS

TECHNICAL FIELD

The present disclosure relates to server access by users, and more particularly relates to providing emergency server access for offline users unable to access information on a secured network.

BACKGROUND

People are becoming more reliant on tools such as electronic calendars and email folders to organize data during the course of business. Simultaneously, an increase in privacy and security concerns may compel a company to implement security measures for their internal networks. Unfortunately, such an increase in security of the internal company network may prevent users from accessing data stored in their calendars and email from outside the office. For example, business people who are traveling may have access to the Internet but not their internal company networks. Other times, people may be in a customer environment where outside connectivity or connectivity to the internal company networks is not available. Still, in other situations, an individual may not have a mobile computing device available to them, but they require access to their data stored on the internal company network. In situations where a user does not have access to data on the internal company network, productivity and efficiency are often negatively impacted.

BRIEF SUMMARY

In one implementation, a method for emergency server access to offline users may include one or more computing devices receiving a request for offline access of data. The request for offline access of data may contain information to identify the offline user and a request for specific data. An action to provide the specific data may be determined responsive to the identification of the offline user. The action may be executed responsive to the determination. The specific data may be transmitted.

One or more of the following features may be included. The information to identify the offline user may be pre-designated by the offline user and may be one of a user name, an email address, or phone number. The request for offline access of data may be received from either the offline user or a third party authorized user. The third party authorized user may have limited access to the specific data. In some embodiments, the method may comprise authenticating the offline user. A response to the request for offline access may be generated using a pre-configured format. The pre-configured format may be one or more of the following: a portable document format (PDF), limitation defined by time, limitation defined by size, limitation defined by field, and automatically copying the offline user in the response. In some embodiments, the method may comprise receiving user preferences for offline access. The user preferences may include one or more of the following: a summary email, a detailed email, a snapshot of a calendar, recent calendar events, and generating a voicemail using a text-to-speech tool. The action may comprise one or more of the following: triggering a workflow, retrieving the specific data, and querying for the specific data.

According to another implementation, a computing system may include at least one processor; at least one memory architecture couple with the at least one processor; a first software module executable by the at least one processor and the at least one memory architecture, wherein the first software module is configured to receive, by one or more computing devices, a request for offline access of data, wherein the request for offline access of data contains information to identify the offline user and a request for specific data; a second software module executable by the at least one processor and the at least one memory architecture, wherein the second software module is configured to determine, responsive to the identification of the offline user, an action to provide the specific data; a third software module executable by the at least one processor and the at least one memory architecture, wherein the third software module is configured to execute the action responsive to the determination; and a fourth software module executable by the at least one processor and the at least one memory architecture, wherein the fourth software module is configured to transmit the specific data.

One or more of the following features may be included. The information to identify the offline user may be pre-designated by the offline user and may be one of a user name, an email address, or phone number. The request for offline access of data may be received from either the offline user or a third party authorized user. Third party authorized user may have limited access to the specific data. The computing system may include a fifth software module executable by the at least one processor and the at least one memory architecture, wherein the fifth software module may be configured to authenticate the offline user. The computing system may include a sixth software module executable by the at least one processor and the at least one memory architecture, wherein the sixth software module may be configured to generate a response to the request for offline access using a pre-configured format. The pre-configured format may be one or more of a portable document format, limitation defined by time, limitation defined by size, limitation defined by field, and automatically copying the offline user in the response. The computing system may include a seventh software module executable by the at least one processor and the at least one memory architecture, wherein the seventh software module may be configured to receive user preferences for offline access. The user preferences may include one or more of a summary email, a detailed email, a snapshot of a calendar, recent calendar events, and generating a voicemail using a text-to-speech tool. The action may comprise one or more of triggering a workflow, retrieving the specific data, and querying for the specific data.

According to another implementation, a computer program product residing on a computer readable storage medium having a plurality of instructions stored thereon, which, when executed by a processor, cause the processor to perform operations comprising: receiving, by one or more computing devices, a request for offline access of data, wherein the request for offline access of data contains information to identify the offline user and a request for specific data; determining, responsive to the identification of the offline user, an action to provide the specific data; executing the action responsive to the determination; and transmitting the specific data.

One or more of the following features may be included. The information to identify the offline user may be pre-designated by the offline user and is one of a user name, an email address, and phone number. In some embodiments, user preferences for offline access may be received. The user preferences may include one or more of a summary email, a detailed email, a snapshot of a calendar, recent calendar events, and generating a voicemail using a text-to-speech tool. The action may comprise one or more of triggering a workflow, retrieving the specific data, and querying for the specific data.

The details of one or more implementations are set forth in the accompanying drawings and the description below. Other features and advantages will become apparent from the description, the drawings, and the claims.

BRIEF DESCRIPTION OF DRAWINGS

In the drawings, like reference numbers generally indicate identical, functional similar, and/or structurally similar elements.

DETAILED DESCRIPTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
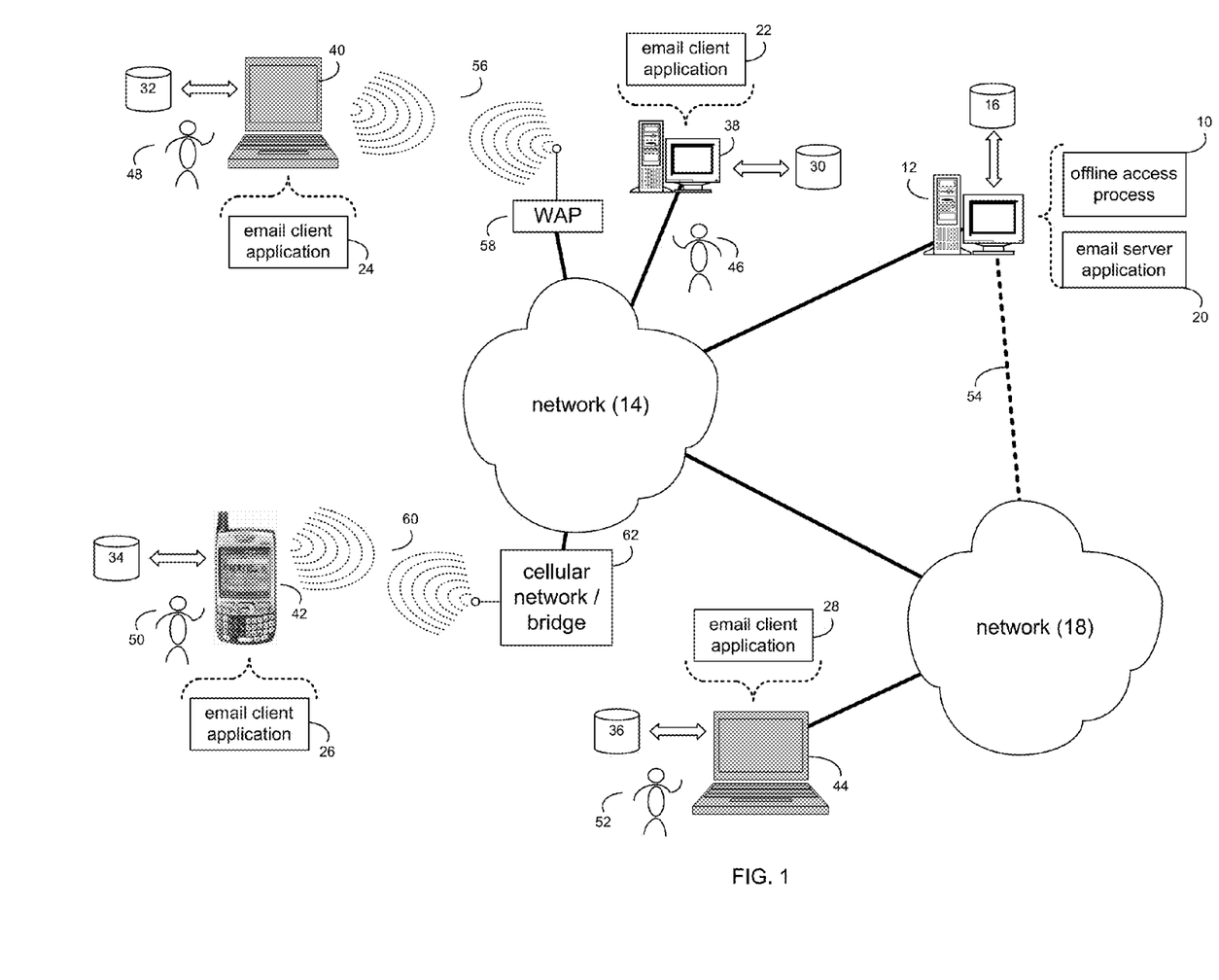
FIG. 1 diagrammatically depicts a process for emergency server access for offline users.

Referring to FIG. 1, there is shown offline access process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the arrival time process may reside on and be executed, in whole or in part, by a client electronic device, such as a personal computer, notebook computer, personal digital assistant, or the like.

As will be discussed below in greater detail, offline access process 10 may provide access to an offline user who does not have access to their information stored on a particular network. Offline access process 10 may provide the information requested by the user in a pre-configured format. Offline access process 10 may also provide information requested by an offline user to a pre-designated third party authorized user of the offline user.

The instruction sets and subroutines of offline access process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an email server application 20, examples of which may include, but are not limited to e.g., Lotus® Domino® Server and Microsoft Exchange Server® (Lotus and Domino are registered trademarks of International Business Machines Corporation in the United States, other countries, or both; and Exchange Server is a registered trademark of Microsoft Corporation in the United States, other countries, or both). Email server application 20 may interact with one or more email client applications (e.g., scheduling client applications 22, 24, 26, 28) for routing and managing scheduling communications. Examples of email client applications 22, 24, 26, 28 may include, but are not limited to, e.g., Lotus Notes® and Microsoft Outlook® (Lotus Notes is a registered trademark of International Business Machines Corporation in the United States, other countries, or both; and Outlook is a registered trademark of Microsoft Corporation in the United States, other countries, or both).

Offline access process 10 may be a stand alone application, or may be an applet/application/script that may interact with and/or be executed within email server application 20. In addition/as an alternative to being a server-side process, the offline access process 10 may be a client-side process (not shown) that may reside on a client electronic device (described below) and may interact with a email client application (e.g., one or more of email client applications 22, 24, 26, 28). Further, the offline access process 10 may be a hybrid server-side/client-side process that may interact with email server application 20 and an email client application (e.g., one or more of email client applications 22, 24, 26, 28). As such, the offline access process 10 may reside, in whole, or in part, on server computer 12 and/or one or more client electronic devices.

The instruction sets and subroutines of email server application 20, which may be stored on storage device 16 coupled to server computer 12 may be executed by one or more processors (not shown) and one or more memory modules (not shown) incorporated into server computer 12.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access email server application 20 and may allow users to e.g., send and receive email communications or calendar events.

Users 46, 48, 50, 52 may access email server application 20 directly through the device on which the email client application (e.g., email client applications 22, 24, 26, 28) is executed, namely client electronic devices 38, 40, 42, 44, for example. However, in some embodiments, the devices (e.g. client electronic devices 38, 40, 42, 44) may no have the email client application (e.g. email client applications 22, 24, 26, 28) and instead may only have access to web browsers. Users 46, 48, 50, 52 may access email server application 20 directly through network 14 or through secondary network 18. Further, server computer 12 (i.e., the computer that executes scheduling application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, Android, iOS or other suitable operating system. (Windows CE is a registered trademark of Microsoft Corporation in the United States, other countries, or both.)

Figure 2:
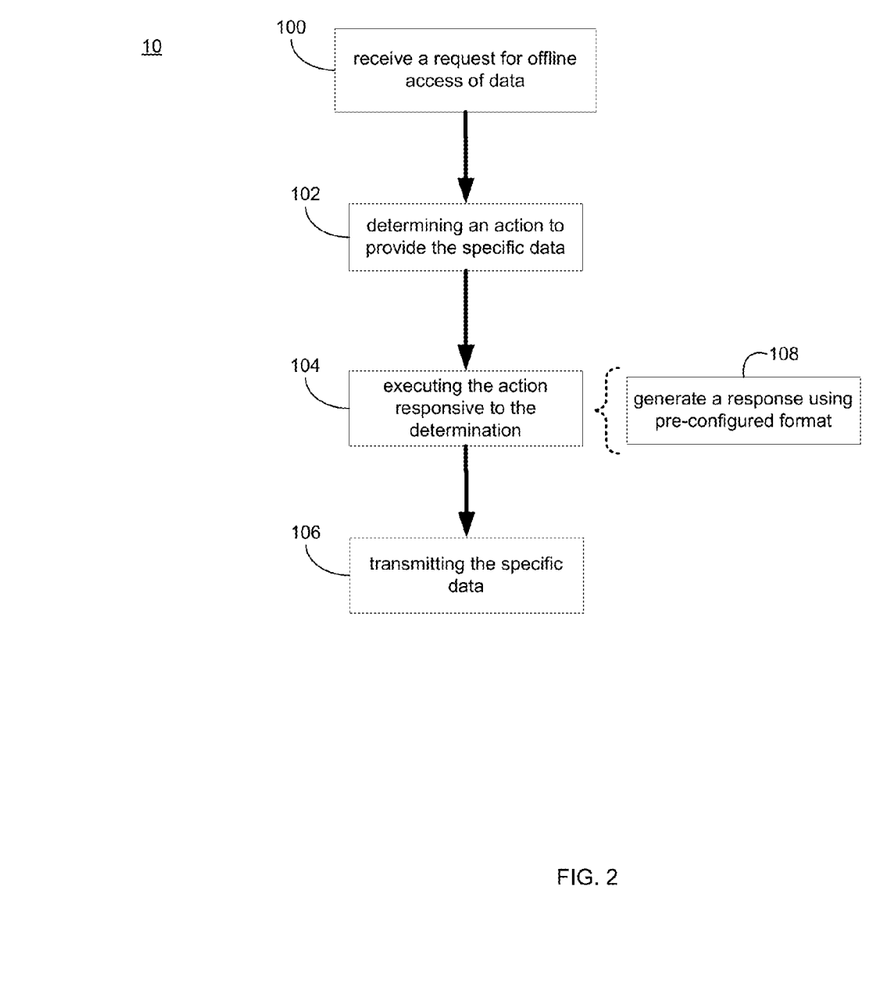
FIG. 2 is a flowchart for emergency server access for offline users executed by the process of FIG. 1.

Referring to FIG. 2, offline access process 10 may receive 100 a request for offline access of data. The request for offline access of data may contain information to identify the offline user and a request for specific data. Responsive to the identification of the offline user, an action to provide the specific data is determined 102. Responsive to the determination, the action may be executed 104. The specific data may be transmitted 106. A response may be generated 108 using a preconfigured format.

Prior to needing offline access to one or more computing devices, an offline user may configure settings or preferences for emergency offline server access. In some embodiments, the emergency offline server access may be associated with an email server application 20. In some embodiments, the email server application 20 may be a calendar application or an email application with a calendar feature. The offline user may configure the settings to designate a proxy email, where the proxy email is a third party email account, such as a personal email account (e.g. Gmail™ account, Yahoo™ account, Hotmail™ account, AOL™ account, etc.). The offline user may configure the settings to designate a proxy phone number, where the proxy phone number is a telephone number associated with the offline user, such as a mobile telephone number or a home telephone number. In some embodiments, the offline user may designate a username and password used to identify the offline user to the one or more computing devices.

In some embodiments, the offline user may designate a third party authorized user. The third party authorized user may be a trusted third person, such as another employee of the company, which has limited access to the offline user's information or account. The trusted third person must have access to the network associated with the email server application 20 or the secured network, such as an internal company network. The limited access may be pre-configured by the offline user, where the offline user designates the type of access and information to be presented to the third party authorized user.

The offline user may configure the offline access preferences to include information that would be used to identify the offline user or to authenticate or authorize the offline user. The offline user may also designate security questions and answers to be used in conjunction with the proxy email, text message or telephone call to authenticate or authorize the offline user. The offline user may choose pre-determined security questions and provide answers to the security questions. In some embodiments the offline user may create the security questions and provide answers. In some embodiments, the offline user may create a personal identification number (PIN) or a security phrase to be used to authenticate or authorize the offline user's identity. The offline user may configure the settings while logged into an email client application. In some embodiments, the offline user may configure the settings through a separate application or website. In some embodiments, the third party authorized user, once designated by the offline user, may configure preferences to include information that would be used to authenticate or authorize the third party authorized user.

In some embodiments, offline access preferences may be designated by the company. The offline access preferences may be based, at least in part, upon a corporate hierarchy, directory, or other organizational structure determined by the company. The offline access preferences may require that any information requested by the offline user trigger an automatic notification to a manager or other individual in the company. In some embodiments, there may be one or more offline access profiles for an offline user. The one or more offline access profiles may include a corporate profile, pre-designated by the company or corporation. The offline access profiles may also or instead by a personal offline access profile, one that is designated by the offline user.

Still referring to FIG. 2, in more detail, a request for offline access of data is received 100. The request may include information to identify the offline user and a request for specific data. The one or more computing devices, such as an organizational server, may receive 100 the request for offline access of data. The request for offline access of data may contain information to identify the offline user or to authenticate or authorize the offline user as well as a request for specific data. The request for offline access of data may be in the form of an email. In some embodiments, the request for offline access of data may be in the form of a text message or a telephone call. The data requested by the offline user may include an offline user's email account, which may include the offline user's entire email account or certain designated email folders. The specific data requested by the offline user may also include one or more of the following: the offline user's calendar, contacts, documents, or folders. The specific data requested by the offline user may also include data accessible on the secured network, such as the corporate directory, organizational information associated with the company, information associated with clients or other discrete information available on the network. In some embodiments, the specific data may include sensitive information, such as data associated with client billing. Such sensitive and/or confidential information may require additional authentication of the offline user. In some embodiments, the requested specific data may need to be computed or processed using other information available on the secure network. For example, the specific data requested may be the outstanding balance for a client. The outstanding balance may need to be calculated using the number of hours worked and the hourly rates associated with the hours worked.

The offline user may be identified using information contained in the request. For example, the user may be identified using an email address or phone number from which the request was received 100. Additionally, the offline user may have pre-configured a username that may be used to identify the offline user. In some embodiments, a password associated with the username may also be included to identify as well as authenticate the offline user.

The offline user or third party authorized user may be authenticated or authorized responsive to the received request. For example, in the case of an offline user, the request may have been an email sent from the pre-designated email address requesting data, such as a calendar event or a contact file. Once the email server application 20 receives 100 the request and verifies that the pre-designated email address is associated with the offline user, the email server application 20 may send an email to the pre-designated email address containing the pre-determined security questions. The offline user would need to send a second email, responsive to the email from the email server application 20 containing the pre-configured answers to the security questions. After the email server application receives the email from the offline user containing the answers to the security questions, the email server application 20 would verify the answers and may authenticate or authorize the offline user. In some embodiments, the email server application 20 will verify the third party authorized user's email or phone number by comparing it to the configurations set by the offline user. In some embodiments, the email server application 20 may authenticate or authorize the offline user or third party authorized user by comparing the email or phone number used to send the request to the email address or phone number previously designated by the offline user.

In the case of a third party authorized user, the third party authorized user may have sent a request to the email server application 20 requesting information for the offline user. In some embodiments, the request may be an email or a text message requesting specific information, such as a calendar event or information from a corporate directory. The third party authorized user may send the request to a specific to a pre-determined email ID or address. The email server application 20 may authenticate or authorize the third party authorized user by comparing the email or phone number used to send the request to the email address or phone number previously designated by the offline user and identifies the offline user by analyzing the request for identifying information, such as the offline user's email address or name in the title or the subject line.

In some embodiments, the third party authorized user may not need to be authenticated, as long as the offline user pre-configured their preferences to sufficiently identify the third party authorized user to the one or more computing devices for emergency offline server access. The request sent by the third party authorized user must include sufficient information to identify the offline user, such as a username, phone number, or email address, so that the third party authorized user is able to access the information for the correct offline user.

Once the offline user has been identified using the information in the received request, the one or more computing devices for emergency offline server access may determine 102 an action to provide the specific data. In some embodiments, the action may include analyzing the received request to identify the type of information requested by the offline user. The system may compare the request for the specific data against a database or other similar tool to identify the appropriate action. The system may determine 102 the action based on the type of data requested. If the data requested is sensitive or confidential, the action may include authenticating and/or authorizing the user prior to determining another action to retrieve the data requested by the offline user.

In some embodiments, the action may include querying a database, server, or other storage medium to locate the data. In some embodiments, the specific data requested may require processing or computing, using information that is available on the secure network. This may trigger a workflow, such a sending an email or request to one or more individuals or modules on the system. The initiated workflow may include contacting the appropriate personnel in the corporation and waiting for a response or authorization from the person. The workflow may include initiating one or more software modules to collect, process, or manipulate various information on the network to produce the specific data requested. In some embodiments, the action may include generating a response to contain the specific data. The response may be generated 108 using the offline user's pre-configured preferences. The action may include generating a response for the offline user, containing the requested specific information to be sent to the third party authorized user. One or more actions may be determined 102, depending on the specific data requested as well as the offline user requesting the data. The additional actions may have been pre-configured by the offline user in their preferences.

After the action to provide the specific data has been determined 102, the action is executed 104. In some embodiments, the one or more actions determined 102 by the system may be executed simultaneously or sequentially. The actions to be executed 104 may include initiating a workflow or generating a response. The actions may be executed 104 immediately or on a pre-determined time delay. The actions executed 104 may involve further interaction, such as communicating with the offline user or the third party authorized user for authentication or authorization.

For example, the system may determine that the action is to query the network for the specific data requested by either the offline user or the third party authorized user may be retrieved. A response may be generated 108 using a pre-configured format. An offline user may designate their offline access preferences for the format of the response with the level of information desired by the offline user when they are configuring their preferences for offline access, as discussed above. Examples of offline access preferences for pre-configured formats may include, but are not limited to, a summary email of all the query results, a detailed email listing all of the offline user's calendar events for a designated time period (the time period may be designated in the preferences or in the request sent to the server), a snapshot of the calendar, a listing of recent calendar events, a listing of all emails received within a pre-designated time period, an email summarizing all unread messages, and the like.

The offline user may also have configured offline access information options which may depend on the type of offline access (direct access via pre-designated email or access via the pre-designated third party authorized user) or the type of information requested. Examples may include, but are not limited to, converting the requested data to a designated format (such as a PDF, table, open office document, internet format, simple text, TTS (text-to-speech), limitation of data defined by time (third party authorized user may have access for a certain amount of time or information is delivered periodically, such as every hour, once a day, once a week), limitation of data defined by size (e.g. maximum size of response, with or without attachments), and limitation of data defined by field (e.g. title of documents, conference call details, sender of emails, subject of emails). The offline user may set their preferences so that whenever a third party authorized user query is made, the offline user is automatically copied on the response generated by the email server application 20.

In some embodiments, there may be multiple pre-configured options. For instance, a pre-configured option may exist for the position of the offline user, in accordance with a corporate hierarchy. Additionally, a personal pre-configured option may have been created by the offline user. In some embodiments, only one option may be used by the system. In other embodiments, one or more of the existing pre-configured options may be used. The offline access information options may be configured in accordance to a company hierarchy or pre-configured in the user's corporate profile based upon the offline user's position. For example, the corporate profile for the offline user may indicate that the offline user's manager is Mr. Brown. The pre-configured offline access information, based, at least in part, on the offline user's corporate profile, may require that the specific information requested by the offline user be emailed to the offline user's manager's email. The system would check the corporate profile, identify the manager of the offline user as Mr. Brown, and generate an email containing the specific data and transmit the email to Mr. Brown. In some embodiments, the pre-configured settings may be augmented by the additional user preferences, such as, in addition to the email transmitted to Mr. Brown, also generating an email/text message/voice mail for the user and transmitting the specific data to the user in the pre-specified configuration.

After the response has been generated 108 using the pre-configured format, the response may be transmitted 106 to the offline user or third party authorized user. The response may be transmitted by email, text message, phone call or any combination thereof. In some embodiments, the offline user may have configured their preferences to also include a second person to receive the response, such as a secretary or assistant.

After the execution 104 of the determined 102 action, the system may transmit 106 the specific data. In some embodiments, the specific data is transmitted 106 the specific data to the offline user. The specific data may be transmitted 106 to a third party authorized user. The data may be transmitted 106 to another user that is specified by the offline user in the request or in the pre-configured settings.

Figure 3A:
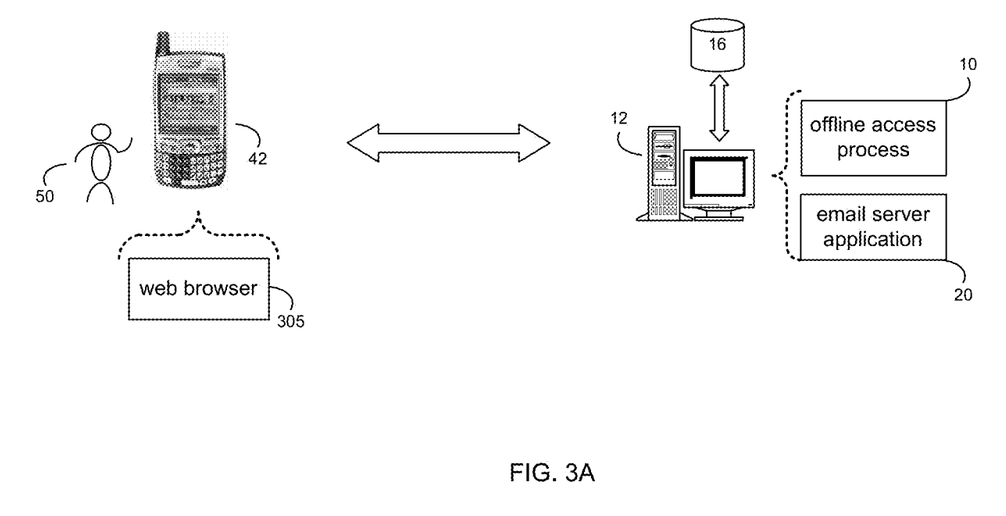
FIGS. 3A and 3B are diagrammatic views of an example of a system for emergency server access for offline users.

Now referring to FIG. 3A, an offline access scenario is depicted. In brief overview, an offline user 50 with a mobile computing device 42 interacts with an offline server application 20 and offline access process 10 hosted on a server 12. The offline user 50 may not have access to their company network and thus cannot access their email, calendar events, or information stored on the internal secure company network. The offline user 50 may use a secondary email address they designated in their offline access preferences to send a request to the server 12. The email may be sent using a web browser 305. The offline user 50 may send an email request to an email address provided by the company for offline access. The offline user 50 may include in the email information necessary to request specific data associated with the offline user 50, such as a calendar event for a particular day.

The offline user 50 may transmit the email request to the server 12 using the mobile computing device 42. Although a mobile computing device is depicted, an offline user 50 may use any client electronic device capable of generating an email and transmitting the email to the server 12. Such devices may include different types of computing devices (e.g. laptops, smart phones, personal computers, tablets). The email server application 20 receives the request from the offline user 50. The offline access process 10 verifies the email address used to send the request and generates a reply email which includes information necessary to authenticate or authorize the offline user 50. This "handshake" authentication process is an example and should not be construed as a limitation of the disclosure. The system may utilize different types of authentication processes to authenticate or authorize an offline user 50 to verify their identity.

Once the offline user 50 has been authenticated, the offline access process 10 uses the information received by the email server application 20 from the offline user 50 to query the offline user's information for the requested data. In some embodiments, the offline access process 10 queries information stored on a storage medium 16. In other embodiments, the offline access process may query information on the server 12 or a different device. The offline access process 10 returns the results to the email server application 20. If the offline user 50 configured their offline access preferences to include pre-configured response formats, the email server application 20 generates a response using the pre-configured format of the offline user 50. The results of the query are then transmitted by the email server application 20 to the web browser 305 the offline user used to access a second email account used to send the request.

In some embodiments, the offline access process 10 may reside on a separate server (not pictured) than the server computer 12 executing the email server application 20. The separate server may be a trusted organizational server that acts on behalf of the offline user to get the information required for that user. The separate server may store the relevant user name and password pairs or other authentication information in a secure fault and may essentially act as the offline user (e.g. a proxy for the offline user) and authenticates the offline user to the server computer 12. The trusted organization server may receive the request from the offline user. The server computer 12 then retrieves the requested information and transmits the information to the trusted organization server, which then transmits the retrieved data to the offline user.

Figure 3B:
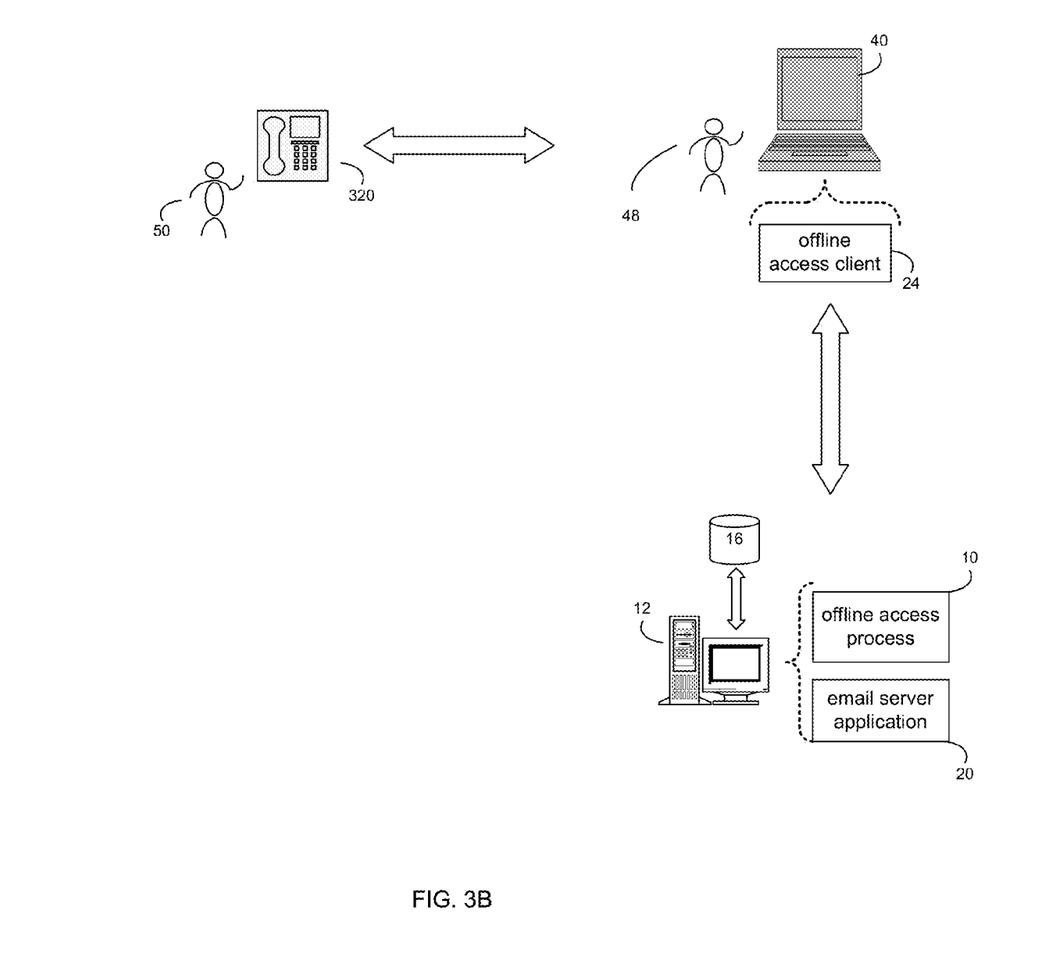

Now referring to FIG. 3B, an offline access scenario involving a third party authorized user is depicted. In brief overview, an offline user 50 uses an email client application 24 executing on a phone 320 or computing device to contact the third party authorized user 48. The third party authorized user 48 via a laptop computer 40 uses the offline access client 24 to interact with an offline server application 20 and offline access process 10 hosted on a server 12.

Still referring to FIG. 3B, and in further detail, an offline access scenario is depicted. In brief overview, an offline user 50 with a phone 320 interacts with an offline server application 20 and offline access process 10 hosted on a server 12. The offline user 50 may not have access to a client electronic device but needs to access their information stored on the internal company network. The offline user 50 may call the third party authorized user 48 they designated in their emergency offline access preferences. The third party authorized user 48 may then transmit an email request to the server 12 using an offline access client 24 executing on their laptop computer 40. Although a laptop computer is depicted, an offline user may use any client electronic device as describe above that is capable of generating and sending an email. The request sent by the third party authorized user 48 may include information identifying the offline user 50, such as the offline user's name or email address. The information identifying the offline user 50 may be included in the body of the request or in the subject of the email. The email server application 20 receives the request from the third party authorized user 48. The offline access process 10 verifies the email address of the third party authorized user 48. In some embodiments, the offline access process 10 generates a reply email which includes information necessary to authenticate or authorize the offline user 50. This "handshake" authentication process is an example and should not be construed as a limitation of the disclosure. The system may utilize different types of authentication processes to authenticate the identity of the third party authorized user 48. In some embodiments, the system may authenticate or authorize the third party authorized user 48 using the third party authorized user's email address and the identifying information of the offline user 50.

Once the third party authorized user 48 has been authenticated, the offline access process 10 uses the information received by the email server application 20 from the offline user 50 to query the offline user's information for the requested data. In some embodiments, the offline access process 10 queries information stored on a storage medium 16. In other embodiments, the offline access process 10 may query information on the server 12 or a different device. The offline access process 10 returns the results to the email server application 20. If the offline user configured their offline access preferences to include pre-configured response formats, the email server application 20 generates a response using the pre-configured formats of the offline user 50. The results of the query are then transmitted by the email server application 20 to the email client application 24 executing on the device 40 of the third party authorized user 48. In some embodiments, the system also sends a copy of the response to the offline user 50. The third party authorized user 48 may then relay the information received from the system to the offline user 50 over the phone 320, via text message, or other form of communication available.

Although the request sent to the server 12 has been primarily been depicted and described as an email, the request may be in any form, including but not limited to an email, a telephone call, text message, or instant message. Likewise, the response generated by the offline access process 10 may also be in any form, including but not limited to an email, telephone call, text message, or instant message.

In yet another example embodiment, an offline user may use a personal email account, such as a Gmail account, to send an email to a pre-specified email address used for emergency offline access of a secured network. The request may contain a request for the outstanding bill for a particular client. The system may identify the user using the Gmail account address used to email the request to the system. The system may determine that the information requested requires an initiation of a pre-determined workflow. The system then emails the appropriate person in the Accounting department. The person in the Accounting department may respond to the email generated by the system with the requested information. The system may then generate a voice message, responsive to the offline user's pre-configured preferences. The system may use a text-to-speech tool and contact the offline user, transmitting the specific data to the offline user.

Alternatively, the user may have designated in their pre-configured settings that the specific information should be transmitted to either a third party authorized user or another user. The information is then transmitted, in accordance to the pre-configured preferences of the user, an email/voicemail/text message containing the specific data. The offline user is then able to contact the third party authorized user or other user to obtain the specific information.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
receiving, by one or more computing devices, a request for offline access of data accessible on a network, wherein the request for offline access of data contains information to identify the offline user and a request for specific data, wherein the network is not accessible by the offline user, wherein the request for offline access of data is received from one of a third party authorized user on behalf of the offline user via a proxy email sent from a third party email account and the offline user via the proxy email sent from the third party email account, wherein at least one of the third party authorized user and the offline user generates the request for offline access from the proxy email, wherein the proxy email requesting offline access of data is sent from the third party email account with a secondary email address to an email account of the network that is not accessible by the offline user, and wherein an email server of the network that is not accessible by the offline user authenticates the identification of the offline user from the information in the proxy email requesting offline access of data;
determining, responsive to the identification of the offline user, an action to provide the specific data;
executing the action responsive to the determination, including determining that the specific data includes sensitive/confidential data, requesting approval from an appropriate individual, and receiving approval from the appropriate individual; and
transmitting the specific data from the network to the offline user.

2. The method of claim 1, wherein the information to identify the offline user is pre-designated by the offline user and is one of a user name, an email address, and phone number.

3. The method of claim 1, wherein the third party authorized user has limited access to the specific data.

4. The method of claim 1, further comprising authenticating the offline user.

5. The method of claim 1, further comprising generating a response to the request for offline access using a pre-configured format.

6. The method of claim 5, wherein the pre-configured format is one or more of a portable document format, limitation defined by time, limitation defined by size, limitation defined by field, and automatically copying the offline user in the response.

7. The method of claim 1, further comprising receiving user preferences for offline access.

8. The method of claim 7, wherein the user preferences include one or more of a summary email, a detailed email, a snapshot of a calendar, recent calendar events, and generating a voicemail using a text-to-speech tool.

9. The method of claim 1, wherein the action comprises one or more of triggering a workflow, retrieving the specific data, and querying for the specific data.

10. A computing system comprising:
   at least one processor;
   at least one memory architecture couple with the at least one processor;
   a first software module executable by the at least one processor and the at least one memory architecture, wherein the first software module is configured to receive, by one or more computing devices, a request for offline access of data accessible on a network, wherein the request for offline access of data contains information to identify the offline user and a request for specific data, wherein the network is not accessible by the offline user, wherein the request for offline access of data is received from one of a third party authorized user on behalf of the offline user via a proxy email sent from a third party email account and the offline user via the proxy email sent from the third party email account, wherein at least one of the third party authorized user and the offline user generates the request for offline access from the proxy email, wherein the proxy email requesting offline access of data is sent from the third party email account with a secondary email address to an email account of the network that is not accessible by the offline user, and wherein an email server of the network that is not accessible by the offline user authenticates the identification of the offline user from the information in the proxy email requesting offline access of data;
   a second software module executable by the at least one processor and the at least one memory architecture, wherein the second software module is configured to determine, responsive to the identification of the offline user, an action to provide the specific data;
   a third software module executable by the at least one processor and the at least one memory architecture, wherein the third software module is configured to execute the action responsive to the determination, including determining that the specific data includes sensitive/confidential data, requesting approval from an appropriate individual, and receiving approval from the appropriate individual; and
   a fourth software module executable by the at least one processor and the at least one memory architecture, wherein the fourth software module is configured to transmit the specific data from the network to the offline user.

11. The computing system of claim 10, wherein the information to identify the offline user is pre-designated by the offline user and is one of a user name, an email address, and phone number.

12. The computing system of claim 10, wherein the third party authorized user has limited access to the specific data.

13. The computing system of claim 10, further comprising a fifth software module executable by the at least one processor and the at least one memory architecture, wherein the fifth software module is configured to authenticate the offline user.

14. The computing system of claim 10, further comprising a sixth software module executable by the at least one processor and the at least one memory architecture, wherein the sixth software module is configured to generate a response to the request for offline access using a pre-configured format.

15. The computing system of claim 14, wherein the pre-configured format is one or more of a portable document format, limitation defined by time, limitation defined by size, limitation defined by field, and automatically copying the offline user in the response.

16. The computing system of claim 10, further comprising a seventh software module executable by the at least one processor and the at least one memory architecture, wherein the seventh software module is configured to receive user preferences for offline access.

17. The computing system of claim 16, wherein the user preferences include one or more of a summary email, a detailed email, a snapshot of a calendar, recent calendar events, and generating a voicemail using a text-to-speech tool.

18. The computing system of claim 10, wherein the action comprises one or more of triggering a workflow, retrieving the specific data, and querying for the specific data.

19. A computer program product residing on a non-transitory computer readable storage medium having a plurality of instructions stored thereon, which, when executed by a processor, cause the processor to perform operations comprising:
   receiving, by one or more computing devices, a request for offline access of data accessible on a network, wherein the request for offline access of data contains information to identify the offline user and a request for specific data, wherein the network is not accessible by the offline user, wherein the request for offline access of data is received from one of a third party authorized user on behalf of the offline user via a proxy email sent from a third party email account and the offline user via the proxy email sent from the third party email account, wherein at least one of the third party authorized user and the offline user generates the request for offline access from the proxy email, wherein the proxy email requesting offline access of data is sent from the third party email account with a secondary email address to an email account of the network that is not accessible by the offline user, and wherein an email server of the network that is not accessible by the offline user authenticates the identification of the offline user from the information in the proxy email requesting offline access of data;
   determining, responsive to the identification of the offline user, an action to provide the specific data;
   executing the action responsive to the determination, including determining that the specific data includes sensitive/confidential data, requesting approval from an appropriate individual, and receiving approval from the appropriate individual; and
   transmitting the specific data from the network to the offline user.

20. The computer program product of claim 19, wherein the information to identify the offline user is pre-designated by the offline user and is one of a user name, an email address, and phone number.

21. The computer program product of claim 19, further comprising receiving user preferences for offline access.

22. The computer program product of claim 21, wherein the user preferences include one or more of a summary email, a detailed email, a snapshot of a calendar, recent calendar events, and generating a voicemail using a text-to-speech tool.

23. The computer program product of claim 19, wherein the action comprises one or more of triggering a workflow, retrieving the specific data, and querying for the specific data.

* * * * *